Oct. 7, 1958 L. E. MORGAN 2,854,802
DETACHABLE TRACTOR MOUNTED COTTON PICKER MEANS
Filed Nov. 25, 1955 4 Sheets-Sheet 1

INVENTOR.
LELAND E. MORGAN

Oct. 7, 1958 L. E. MORGAN 2,854,802
DETACHABLE TRACTOR MOUNTED COTTON PICKER MEANS
Filed Nov. 25, 1955 4 Sheets-Sheet 2

INVENTOR.
LELAND E. MORGAN
BY Weatherford & Weatherford
Attys

Oct. 7, 1958     L. E. MORGAN     2,854,802
DETACHABLE TRACTOR MOUNTED COTTON PICKER MEANS
Filed Nov. 25, 1955     4 Sheets-Sheet 3

INVENTOR.
LELAND E. MORGAN
BY
Weatherford & Weatherford
attys

Oct. 7, 1958 L. E. MORGAN 2,854,802
DETACHABLE TRACTOR MOUNTED COTTON PICKER MEANS
Filed Nov. 25, 1955 4 Sheets-Sheet 4
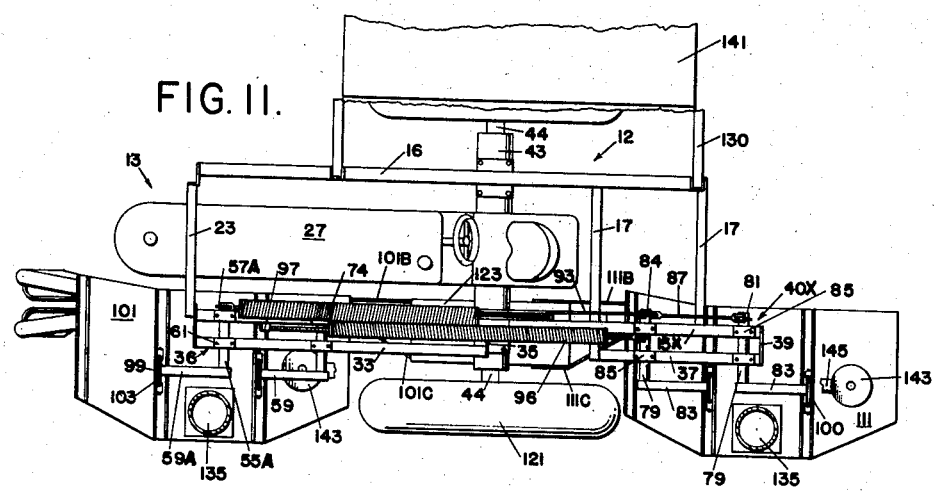
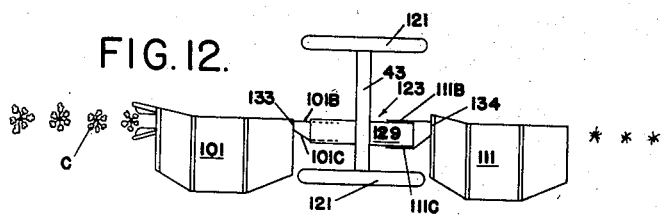
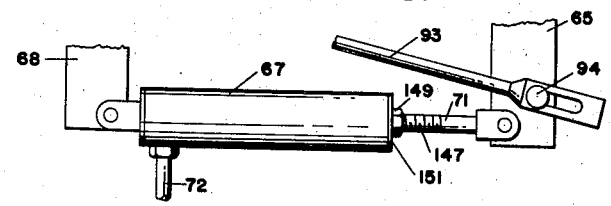
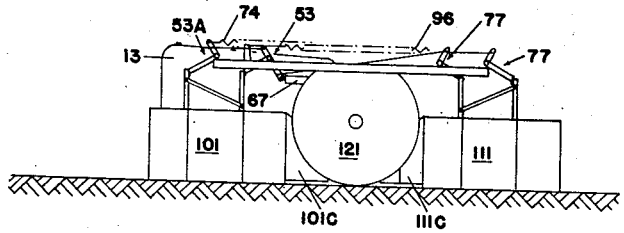
INVENTOR,
LELAND E. MORGAN
BY
Weatherford & Weatherford
attys

United States Patent Office 2,854,802
Patented Oct. 7, 1958

2,854,802
DETACHABLE TRACTOR MOUNTED COTTON PICKER MEANS

Leland E. Morgan, Pine Bluff, Ark., assignor to Ben Pearson, Incorporated, Pine Bluff, Ark., a corporation of Arkansas Application November 25, 1955, Serial No. 548,827

9 Claims. (Cl. 56—14)

This invention relates to certain new and useful improvements in tractor-mounted cotton picking means and in the means and method of mounting cotton picking means upon a tractor, and more particularly relates to new and novel means for mounting and controlling the position of cotton picking means and for detachably supporting the cotton picking means from a conventional type tractor.

More particularly this invention relates to a new and novel means of mounting a pair of cotton picking units upon a conventional tractor and for supporting the pair of picking units in fore-and-aft staggered or alined arrangement whereby both of the units are enabled to successively operate upon a single row of cotton.

Heretofore arrangements of cotton picking units in fore-and-aft disposition for successive operation upon a single row of cotton have been arranged in the so-called tandem-type of arrangements in which a pair of picking units respectively designated as a right-hand unit and left-hand unit have been arranged in fore-and-aft relationship with the forward end of the rearmost unit being rigidly coupled to the rearward end of the forwardmost unit by the tunnel or enclosed passageway providing an elongated interconnected double unit through which the plants of the cotton successively pass. The coupled units have been suspended beneath the frame of the supporting tractor and prior practice has heretofore required that such tractors be specially designed, elevated frame tractors having a frame of height adequate to clear and overlie the coupled units in order to accommodate the units thereunder. Such elevated frame tractors are relatively impractical for uses other than the transportation of the picker units and have not heretofore been commercially adaptable for detachably carrying the coupled picking units or for the discharge of same to permit the use of the tractor under other conditions.

It is contemplated in the present invention that a novel detachable saddle-like supporting means be provided in a cotton picker whereby cotton picking units may be removably supported from a conventional low body-type of tractor. This novel supporting means is adapted to be detachably connected to the axle housing and to the frame of the tractor with a minimum amount of attachment means. In addition, no modifications to the tractor are required for the attachment of the supporting means thereto whereby the cotton picker units and support means may be quickly and easily attached to and detached from the tractor so that the tractor may be used not only as a carriage means for the cotton picker, but on other jobs as well. In contrast to the disposition of the picking units beneath the frame in the previous tandem-type cotton pickers, the novel saddlelike supporting means of the cotton picking units of the present invention supports one of the cotton picking units in side-by-side relationship with the body of the tractor forward of the main axle of the tractor, and the other cotton picking unit rearward of the axle and the body of the tractor, the cotton picking units being spaced apart and movable relative to one another. Additionally, guiding shield means is provided which is telescopically and slidably engaged by the units to permit movement of the units relative thereto and to guide the cotton from the forward picking unit under the axle to the rearward cotton picking unit. Said shield means permits the cotton to expand for repositioning but limits the plant limbs to partial expansion so as to prevent whipping of the limbs which might cause a loss of loosened cotton.

It is further contemplated that improved means be provided for raising and lowering the picking units.

The principal object of the present invention is to provide improved cotton picker means.

A further object is to provide detachable supporting means for a cotton picker in which a pair of picking units are separably supported in longitudinally spaced relation, one unit being supported in side-by-side relationship with the body of the tractor forward of the main axle, and the other unit being disposed rearward of the body of the tractor and the axle in fore-and-aft relationship with the forward unit.

A further object is to provide means for guiding the cotton plants past the axle of the tractor, said means being slidably and telescopically engaged at opposite ends with said units.

A further object is to provide such guiding means in which the cotton plant is permitted to expand for repositioning of the cotton bolls relative to the cotton picking elements of the rearward unit and yet such expansion is limited so as not to whip the plant and cause loose cotton to drop from the plants.

A further object of the invention is to provide improved means for removably connecting the cotton picking units to the supporting means.

A further object is to provide an improved means for raising and lowering the cotton picking units into and out of an upper carrying position, an intermediate cotton picking position and a lower detaching position, said means including a plurality of bell cranks pivotally mounted on said supporting means and including hydraulic actuating means acting in conjunction with spring means, whereby the cotton picking units are easily moved away from cotton picking position and detaching position against the force of gravity.

A further object of the invention is to provide new and novel means of interconnecting picking unit supporting means for conjoint positional movement.

A further object is to provide means for preventing the weight of the tractor from bearing on the rearward cotton picking unit when uneven ground is encountered.

A further object is to generally improve the design and construction of cotton pickers.

The means by which the foregoing and other objects of the present invention are accomplished and the manner of their accomplishment will be readily understood from the following specification upon reference to the accompanying drawings, in which:

Fig. 9 is a diagrammatic side elevational view of the cotton picking means of the present invention, illustrated as mounted on a tractor with the cotton picking units shown in a detaching position.

Fig. 10 is an enlarged fragmentary side elevational view of the hydraulic actuating means illustrating a modification thereto to provide piston limit means.

Fig. 11 is a fragmentary top plan view of a modified embodiment of the cotton picking means of the present invention, illustrated as mounted on a tractor.

Fig. 12 is a diagrammatic plan view of the cotton picking units of Fig. 11 illustrating their alined fore-and-aft disposition and their relationship to a row of cotton.

Figure 1:
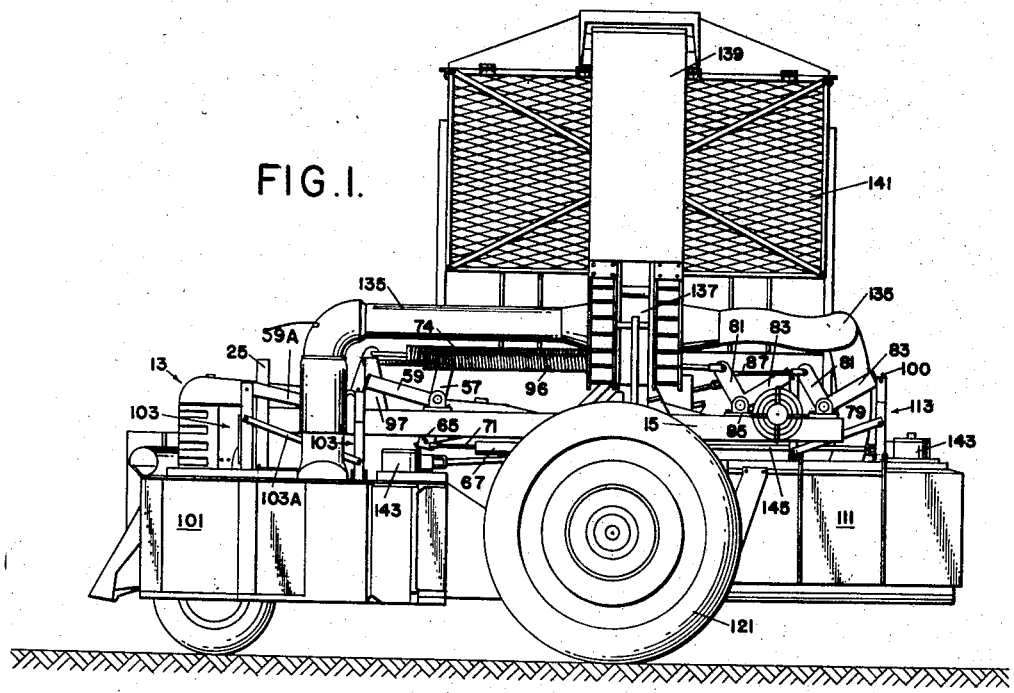
Fig. 1 is a side elevational view of a preferred embodiment of the cotton picker of the present invention illustrated as mounted on a tractor, the picking units being in raised or carrying position.

Referring now to the drawings in which the various parts are indicated by numerals, the tractor engaging framework 11 is adapted to be mounted on a conventional low bodied tractor 13, i. e., a tractor in which the frame is interposed between the traction wheels adjacent the axle as distinguished from an elevated frame tractor in which the frame is disposed adjacent the top of the traction wheels.

Tractor engaging framework 11 preferably includes a main frame 12 comprising a pair of transversely spaced parallel longitudinal beams 15, 16 joined adjacent their rearward ends as by a pair of longitudinally spaced crossbeams 17. Additionally, framework 11 includes a yoke 21, having a top member 23 and a pair of side members 24, 25 depending from opposite ends of top member 23, yoke 21 being adapted to embrace the engine hood 27 of tractor 13, with top member 23 overlying hood 27 and side members 24, 25 extending downwardly on opposite sides of the hood but spaced therefrom. Side member 25, which is preferably spaced at a greater distance from hood 27 than side member 24, is inwardly offset as at 25A adjacent the lower end thereof in order to be disposed properly for attachment with frame 28 of tractor 13, and to provide clearance for a forward picking unit when same is mounted on the framework. The lower ends of side members 24, 25 are attached to opposite sides of frame 28, preferably as by means of adapter brackets 29, 29A and bolt means 30. It will be understood that the size and shape of adapter brackets 29, 29A may be varied to accommodate varying tractors to which the frame may be attached.

Figure 2:
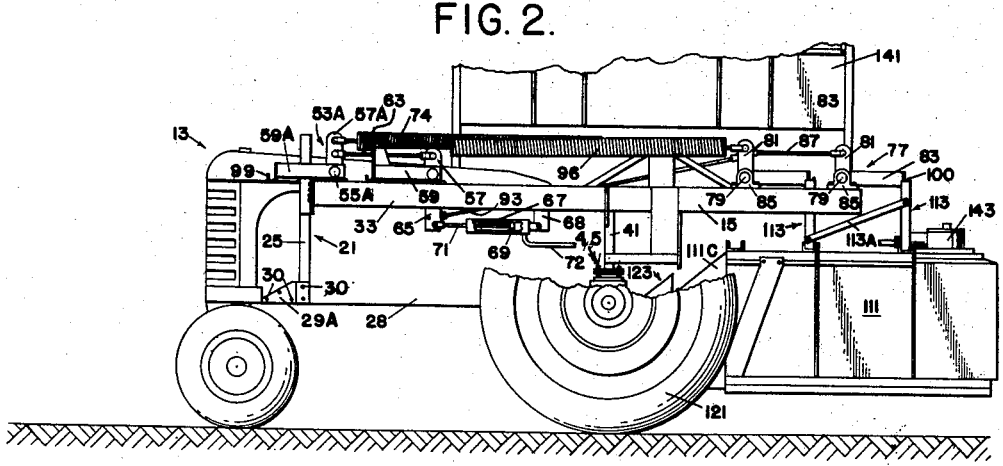
Fig. 2 is a fragmentary side elevational view of the mounted cotton picker with the forward cotton picking unit removed and parts broken away and shown in section for purposes of illustration, the rearward unit being illustrated in the cotton picking position.
Figure 4:
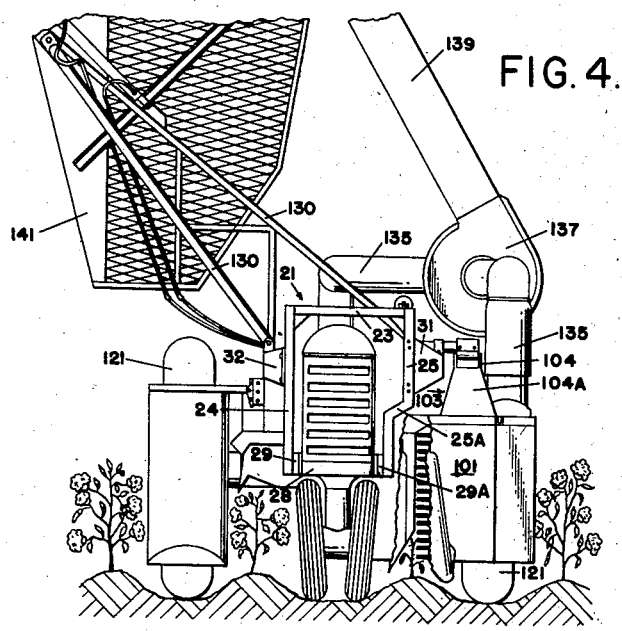
Fig. 4 is a fragmentary front elevational view of the mounted cotton picker with parts broken away for purposes of illustration.

In the preferred form, which is best illustrated in Figs. 2 and 4, adapter brackets 29, 29A are substantially triangular in shape. The lower ends of side members 24, 25 are respectively removably attached to the vertical side of adapter brackets 29, 29A as by bolt means 30. It will be understood that the brackets 29 have the same shape except that they respectively have right and left handed symmetrical characteristics. While it is preferred that brackets 29, 29A and side members 24, 25 be detachably rigidly interconnected, they may be otherwise rigidly connected and may in some instances be permanently connected. Brackets 29, 29A are inwardly offset whereby a portion of each of the brackets is adapted to be engaged in face-to-face abutment with frame 28 and is attached thereto as by additional bolt means 30. Side members 24, 25 are respectively removably attached as by bolt means to plates 31, 32 which are respectively joined to the forward ends of longitudinal beams 15 and 16 as by welding.

Figure 3:
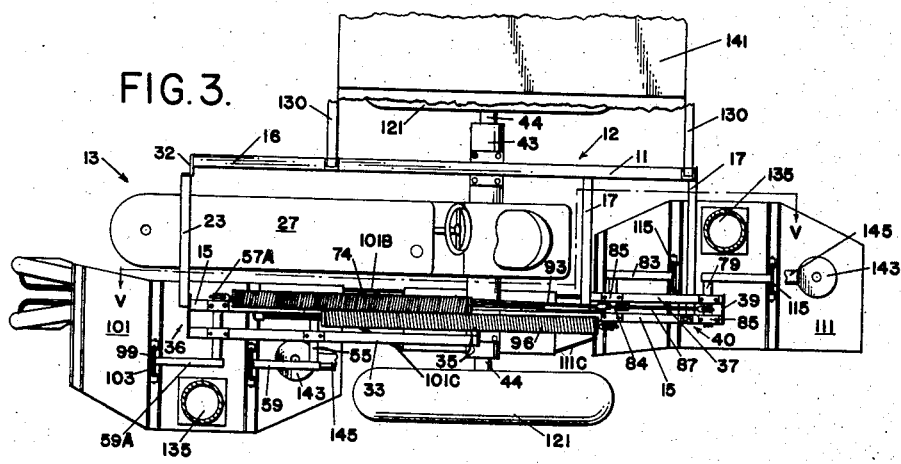
Fig. 3 is a fragmentary top plan view of the mounted cotton picker with parts broken away and shown in section for purposes of illustration.

Tractor engaging framework 11 is preferably provided with a forward auxiliary supporting beam 33 which is disposed substantially parallel with longitudinal beam 15 adjacent the forward end thereof and connected thereto as by plate 31 and cross member 35 to form a forward supporting bed 36. Forward supporting beam 33 is preferably disposed adjacent and spaced from the outer side of longitudinal beam 15 remote from engine 27. Similarly, tractor engaging framework 11 is provided with a rearward auxiliary supporting beam 37 which is disposed substantially parallel with longitudinal beam 15 adjacent the rearward end thereof and connected thereto by cross beams 17 and plate 39 to form a rearward supporting bed 40. Rearward supporting beam 37 is preferably disposed adjacent and spaced from the inner side of longitudinal beam 15 facing engine 27, as best illustrated in Fig. 3.

Figure 5:
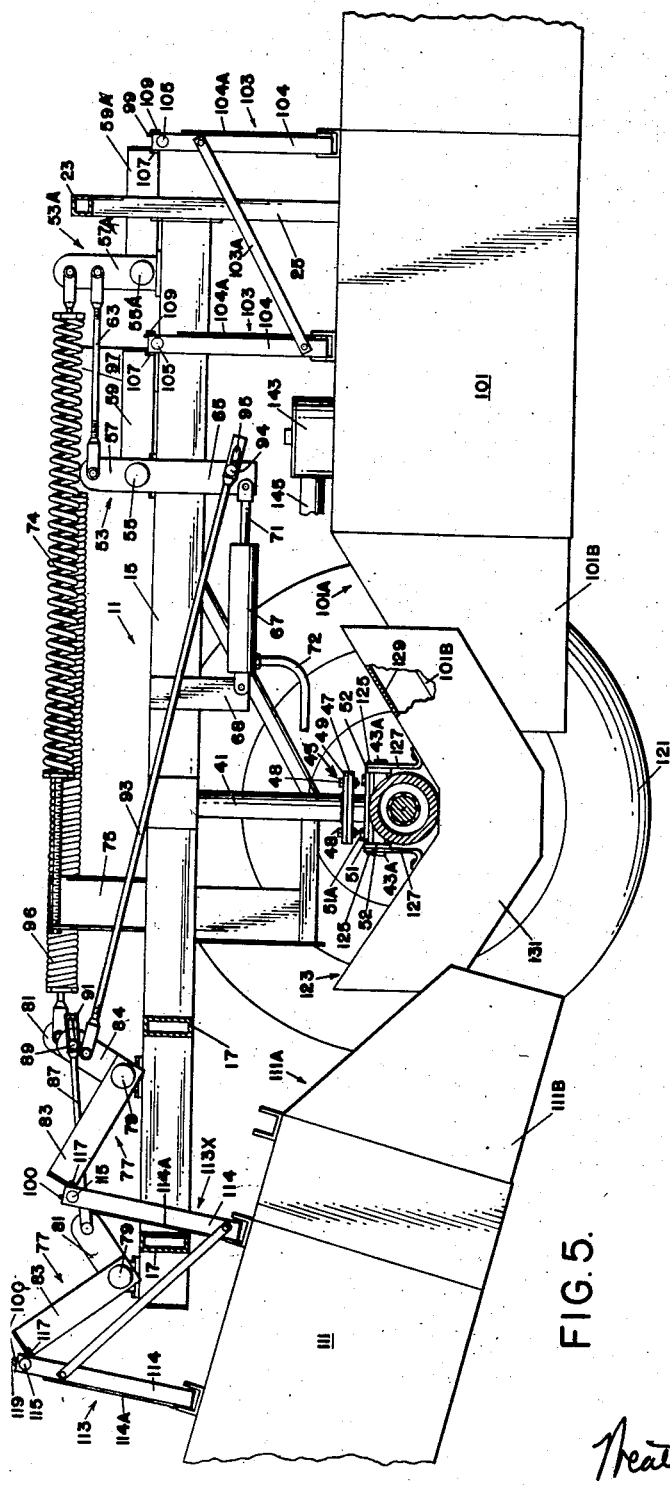
Fig. 5 is an enlarged fragmentary view taken as on the line V—V of Fig. 3 illustrating the rearward picking unit lifted and tilted upward as when uneven terrain is encountered.

Main frame 12 is also provided with a pair of stanchions 41 respectively depending from and supporting longitudinal beams 15, 16, the stanchions being adapted to detachably engage the main axle housing 43 of tractor 13 whereby main frame 12 is supported therefrom. Housed in main axle housing 43 is a rotatably mounted axle 44. Stanchions 41 may be respectively attached to axle housing 43 as by means of adapters 45. It will be understood that the form of adapters 45 may be varied to adapt to variations in structure among types of tractors to which attached. Thus in one type of tractor, stanchions 41 are connected to axle housing 43 by adapters 45 as best illustrated in Fig. 5. Thus each of adapters 45 is provided with an upper flange 47 adapted to be removably secured as by bolt means 48 to a lower flange 49 rigidly connected to stanchions 41. Each of adapters 45 is also provided with a lower flange 51 which is adapted to be removably engaged with the axle housing 43 as by suitable bolt means 51A. In the particular adapter illustrated depending flanges 52 are respectively welded to the rearward edge and forward edge of flange 51, flanges 52 each having a U-shaped cut-out portion adjacent its lower edge which is adapted to embracingly engage stud 43A on axle housing 43 to limit rotation of the adapter relative to the housing.

The height of stanchions 41 is such that when framework 11 is assembled with tractor 13 the engine 27 will be interposed between longitudinal beams 15, 16. Thus it is apparent from the foregoing description that, when assembled with the tractor 13, framework 11 forms a saddlelike supporting structure which embraces the body of the tractor 13 and is spaced therefrom.

A pair of lift elements which may comprise a pair of bell cranks 53, 53A are pivotally mounted substantially in longitudinal alinement on forward supporting bed 36. Bell crank 53 comprises a transverse shaft 55, an upper arm 57 mounted adjacent the inward end of said shaft, and a forwardly projecting lift arm 59 mounted adjacent the outward end of shaft 55, arms 57, 59 being respectively fixedly mounted on shaft 55, preferably as by keying thereto. Similarly bell crank 53A comprises a transverse shaft 55A, an upper arm 57A mounted adjacent the inward end of said shaft, and a forwardly projecting lift arm 59A mounted adjacent the outward end of shaft 55A, arms 57A, 59A being respectively fixedly mounted on shaft 55A. The means by which the bell cranks 53, 53A are pivotally mounted on supporting bed 36 preferably comprises two pairs of bearings 61 in which shafts 55, 55A are respectively journalled, the bearings being attached to forward supporting bed 36, as by suitable bolt means. An adjustable link 63 is connected at its opposite ends to upper arms 57, 57A whereby arms 57, 57A are interconnected for conjoint movement. Preferably rearward bell crank 53 is provided with an integral depending arm 65 to which is coupled actuating means, said actuating means preferably comprising hydraulic actuating means including a cylinder 67 which is connected at one end to a depending bar 68 on frame 11 and which has a piston 69 slidably engaged therein. Said hydraulic actuating means includes a piston rod 71 which is pivotally coupled at one end to depending arm 65 and at the other end to piston 69 whereby actuation of said hydraulic actuating means is effective to conjointly pivot bell cranks 53, 53A.

Coupled to cylinder 67 and communicated with the interior thereof rearward of piston 69 is a hydraulic line 72, which provides the conduit for hydraulic fluid to flow to cylinder 67 from a conventional hydraulic pump, not shown, preferably powered by tractor 13. Suitable hydraulic control means is provided for causing the hydraulic fluid to flow through line 72, retaining the fluid in the line under static conditions, or opening the line to relieve the pressure therein, whereby piston 69 may be forced forward towards an extended position, held in a stationary position, or permitted to move rearward towards a retracted position, respectively. A spring 74 is adjustably coupled at one end to a post 75 mounted on framework 11 and at the other end to one of the upstanding bell crank arms as the arm 57A.

A rearward pair of lift elements which may comprise a pair of bell cranks 77 are mounted in substantially longitudinal alinement on rearward supporting bed 40. Each of bell cranks 77 comprises a transverse shaft 79 having an upper arm 81 and having a rearwardly projecting lift arm 83 mounted adjacent the inward end thereof. The forward one of bell cranks 77 is provided with an additional upper arm 84 mounted on shaft 79 inwardly of upper arm 81. Arms 81, 83 and 84 are respectively fixedly mounted on shaft 79, preferably as by keying thereto. The means by which bell cranks 77 are pivotally mounted on frame 11 preferably comprises two pairs of bearings 85 in which shafts 79 are respectively journalled, the bearing being attached to rearward supporting bed 40 as by bolt means.

One end of an adjustable link 87 is pivotally connected to the rearward upper arm 81 and the other end of link 87 has a lost motion connection with arm 84. Said lost motion connection may comprise a pin 89 connected to arm 84, the pin being slidably engaged in a slot 91 provided in said other end of link 87. An elongated link 93 is pivotally connected at one end to arm 84 and has a lost motion connection at the other end with depending arm 65 whereby movement of piston 69 is effective to conjointly pivot bell cranks 77. Said lost motion connection may comprise a pin 94 connected to depending arm 65, the pin being slidably engaged in a slot 95 provided in said other end of link 93. A spring 96 is adjustably coupled at one end to a post 97 and at the other end to the forward one of arms 81.

A pair of transversely extending forwardly projecting J-shaped hooks 99 are respectively attached at the distal ends of lift arms 59, 59A. Similarly an additional pair of transversely extending J-shaped hooks 100 are respectively attached to and project rearwardly from the distal ends of lift arms 83. Hooks 99, 100 are preferably substantially identical, except that hooks 99 are forwardly and upwardly open, while hooks 100 are rearwardly and upwardly open.

Figure 6:
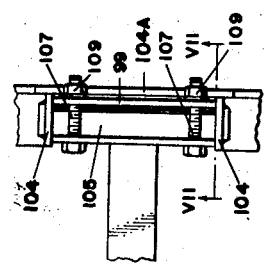
Fig. 6 is a further enlarged fragmentary plan view of one of the J-shaped hooks by which the cotton picking units are detachably supported.

A forward cotton picker unit 101, preferably a left-hand unit, is provided with a pair of upstanding hanger brackets 103 which may be braced by a diagonally disposed brace 103A. Each of hanger brackets 103 may comprise a pair of straps 104 which are inwardly angled towards one another for a major portion of their length and are bent in parallel relationship along a minor portion of their length adjacent their upper ends, as best illustrated in Fig. 4. The inwardly angled portions of straps 104 are preferably joined as by plates 104A, which may be attached to straps 104 as by welding. A pair of transverse bars 105 are respectively attached adjacent the upper ends of upstanding hanger brackets 103, as by extending the ends of bars 105 through apertures in straps 104 and welding the respective ends to the straps, as best illustrated in Fig. 6. Bars 105 are removably engaged by hooks 99 whereby left-hand picker unit 101 is removably supported from frame 11 by bell cranks 53, 53A. Each of hooks 99 is provided with retaining pins 107 for securing transverse bars 105 in hooks 99. A pair of retaining pins 107 respectively extend through apertures which are in longitudinal register, provided in the opposite sides of hooks 99, said retaining pins overlying transverse bars 105. Retaining pins 107 may be removably secured in said apertures as by providing a threaded portion adjacent one end of each of the pins which may be threadedly engaged by nuts 109, or retaining pins 107 may be secured otherwise, as for example by cotter pins.

Similarly, a rearward cotton picking unit 111, which is preferably a right-hand unit in the preferred embodiment of the present invention as best illustrated in Fig. 3, is provided with a pair of upstanding hanger brackets 113, 113X, which may be braced by a diagonal brace 113A. In a manner similar to the construction of hanger brackets 103, hanger brackets 113, 113X may comprise a pair of straps 114 which are inwardly angled towards one another for a major portion of their length and are bent in parallel relationship along a minor portion of their length adjacent their upper ends. The inwardly angled portions of straps 114 are preferably joined as by plates 114A, which may be attached to straps 114 as by welding. Unit 111 and unit 101 are substantially identical in construction except that in the preferred embodiment they respectively have right and left handed symmetrical characteristics. Units 101, 111 are preferably of the spindle type cotton picking units, more particularly of the general type shown in Rust Patent No. 2,076,598, issued April 13, 1937, although it will be understood the present invention may be employed with other types. A pair of transverse bars 115 are respectively attached adjacent the upper ends of upstanding brackets 113, 113X, as by extending the ends of bars 115 through apertures in straps 114 and welding the respective ends to the straps. Bars 115 are removably engaged by hooks 100 whereby forward cotton picking unit 111 is removably supported from frame 11 by bell cranks 77. Transverse bars 115 are removably secured in hooks 100 by a pair of retaining pins 117 which respectively extend through apertures, which are in longitudinal register, provided in the opposite sides of hooks 100. Retaining pins 117 are secured in said apertures by nuts 119 threadedly engaged with the ends of the pins. Retaining pins 117 overlie transverse bars 115 whereby the bars are removably secured in hooks 100.

Figure 8:
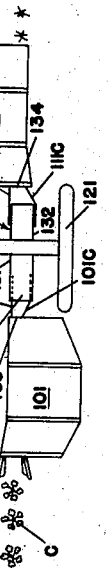
Fig. 8 is a diagrammatic plan view of the cotton picking units illustrating their fore-and-aft offset disposition relative to one another and their relationship to a row of cotton in the embodiment of Fig. 1.
Figure 7:
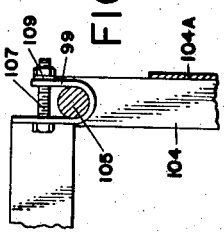
Fig. 7 is a fragmentary sectional view taken as on the line VII—VII of Fig. 6.

Thus it will be seen in the preferred embodiment, forward cotton picking unit 101 is disposed in side-by-side relationship with the forward portion of engine 27 and forward of axle housing 43. Rearward cotton picking unit 111 is disposed rearwardly of the body of tractor 13 and rearwardly of axle housing 43. Cotton picking unit 111 is suspended independently of cotton picking unit 101 and is spaced rearwardly thereof by a distance equal to substantially the length of one of cotton picking units 101, 111. Thus, by being individually suspended units 101, 111 are easily handled. Also it will be understood cotton picking unit 101 is preferably substantially disposed adjacent one side of longitudinal beam 15 forward of axle housing 43, and cotton picking unit 111 is preferably substantially disposed adjacent the other side of said longitudinal beam 15 rearward of axle housing 43, whereby the cotton picking units are disposed in spaced fore-and-aft offset relationship with the axle housing interposed therebetween and are adapted to pick one row of cotton at a time, as best illustrated in Fig. 8. It will be understood, however, that it is not intended that the present invention be limited to the units being disposed in the above described offset relationship, but the units may be disposed in other fore-and-aft relationships, as for example, two right hand units or two left hand units may be employed and the units disposed in fore-and-after alinement to pick one row of cotton. Thus, in Figs. 11 and 12 is illustrated an alternate embodiment of the invention in which the units are in fore-and-aft alinement. In this embodiment illustrated two left hand units are employed. It will be understood that in the alternate embodiment the structure of the rearward supporting bed 40X is modified somewhat from the rearward supporting bed of the preferred embodiment. Thus, rearward supporting beam 37 is disposed adjacent and spaced from the outer side of longitudinal beam 15X, in contradistinction to the disposition of the rearward supporting beam in the preferred embodiment. Also, beam 15X is lengthended to permit the unit 111 to be suspended clear of wheel 121. Additionally, it will be understood that the bell cranks and other related parts supporting rearward unit 111 will be substantially identical and will be disposed in substantially the same manner as the bell cranks and other related parts supporting forward unit 101.

In addition, it will be understood that the present invention may be employed with varying types of tractors as in some installations where the picking units are disposed so that the plant entrances open towards the rear instead of forward in which case the tractor is driven rearward to perform the cotton picking operation.

A guide shield 123 is interposed between the forward and rearward cotton picking units 101, 111 and underlying axle housing 43, the guide shield being rigidly held in place as by detachably connecting the guide shield to the axle housing or to tractor engaging framework 11. This attachment may comprise screw means 125 extending through apertures in upstanding flanges 127 provided on guide shield 123 and threadedly engaged in depending flanges 52. The opposite ends of guide shield 123 preferably telescopically and slidably fit with extensions 101A, 111A on units 101, 111, the forward end of the guide shield preferably telescoping on the outside of the forward unit extension 101A, and the rearward end of the guide shield preferably telescoping within rearward unit extension 111A. Guide shield 123 is open at the bottom and the ends to receive the extensions 101A, 111A, and preferably comprises a top member 129 and side members 131, 132 depending from opposite edges of top member 129 whereby shield 123 in transverse cross section is shaped as an inverted U. The mid section of guide shield 123 is depressed below the ends thereof to form a shield, which, when viewed from the side, has the shape of a V having widely spread sides, as best illustrated in Fig. 5. Thus the depression in the mid section of shield 123 underlies axle housing 43 and guides the top of the cotton plants below the axle housing and thence upwardly to their normal upstanding position.

Extension 101A preferably comprises spaced upstanding side plates 101B, 101C, which are attached to and project from opposite sides of the exit opening 133 of the cotton plant tunnel of the forward unit 101. Similarly, extension 111A preferably comprises spaced upstanding side plates 111B, 111C which are attached to and project from opposite sides of the entrance opening 134 of the cotton plant tunnel of unit 111. Side plates 101B, 101C and 111B, 111C are respectively disposed in diverging relationship with their free ends being preferably bent so as to be in parallel relation with each other and with sides 131, 132. The top edges of side plates 101B, 101C and 111B, 111C preferably angle downwardly to conform to the angle of top member 129, the top edges of side plates 101B, 101C and 111B, 111C being sufficiently spaced from the top member, when the units are in a lowered position, so as to permit upward movement of units 101, 111 into a carrying position, as hereinafter described.

From the foregoing it will be apparent that a passageway is provided for the cotton plant between the forward cotton picking unit 101 and the rearward cotton picking unit 111, the passageway decreasing in height as the cotton plant moves towards the rearward unit until a minimum height is reached underlying axle housing 43, thence the height of the passageway increases. Conversely the width of the passageway increases as the cotton plant leaves the forward unit 101 and decreases in width before the cotton plant enters the rearward unit 111. The maximum width of the passageway is preferably less than the fully expanded position of the branches of the cotton plant, whereby the branches will be retained in partially compressed disposition so as not to whip and cause loose cotton to drop therefrom. From the foregoing it will be apparent that a passageway is provided which depresses the tops of the cotton plants for passage below axle housing 43 and at the same time permits the cotton plants to partially laterally expand, and thence recompresses the plants to effect entrance into the rearward cotton picking unit. It has been found the lateral expansion and the top compression of the cotton plants as they move through the passageway repositions the cotton for better engagement by the picking elements of the rearward cotton picking unit 111.

Each of cotton picking units 101, 111 is preferably provided with a suction duct 135 and a blower 137 attached thereto whereby cotton is moved from the cotton picking units through suction ducts 135, thence through discharge duct means 139 into a basket 141. Basket 141 is mounted on supporting means 130 extending from framework 11 on the opposite side from cotton picking units 101, 111, whereby the weight of the cotton picking units is laterally counterbalanced by the basket. Units 101, 111 are also provided with conventional drive means including a gear box 143 having one end of a drive shaft 145 coupled thereto. The other end of drive shaft 145 is coupled through suitable gearing, not shown, to tractor engine 27, whereby units 101, 111 may be driven thereby.

To assemble the cotton picker with a conventional tractor 13, yoke 21 is secured to frame 28 of tractor 13 and adapters 45 are mounted to the axle housing 43. The frame 12 is then brought into place with engine 27 interposed between longitudinal beams 15, 16 and the frame secured to the tractor by attaching plates 31 to yoke 21 and by removably fixing stanchions 41 to adapters 45. Guide shield 123 may then be attached to flanges 52. Basket 141 is secured in place and the forward cotton picking unit 101 and the rearward cotton picking unit 11 are respectively suspended from hooks 99, 100 of bell cranks 53, 53A, 77.

It will be understood that when removing the cotton picker from the tractor it will not be necessary to completely dismantle the cotton picker. It is only necessary to detach units 101, 111 from bell cranks 53, 53A, 77 in a manner hereinafter described, to remove guide shield 123, and to unfasten the bolts securing plates 31 to yoke 21 and stanchions 41 to axle housing 43. Frame 12 may be then raised and the tractor driven out. Thus it will be seen the cotton picker is quickly and easily attachable to and detachable from the tractor whereby the tractor may be used, not only as a carriage means for the cotton picker, but on other jobs as well.

In the operation of the cotton picker the drive wheels 121 of tractor 13 straddle two rows of cotton and the cotton picking units 101, 111 are designed to pick from one row of cotton in a manner as best illustrated in Figs. 4 and 8, or as illustrated in Fig. 12. Thus, the cotton is first picked by the forward picking unit, then the cotton is passed beneath guide shield 123, and finally the rearward picking unit picks the remaining cotton.

The cotton picking units 101, 111 are shiftable into and out of three different positions; an upper carrying position as best illustrated in Fig. 1; an intermediate cotton picking position as best illustrated by the disposition of unit 101 in Fig. 5 and unit 111 in Fig. 2; and a lower detaching position as best illustrated in Fig. 9. It will be understood, of course, that the units may be shifted, if desired, to any positions intermediate the three above named positions.

In the carrying position, lift arms 59, 59A, 83 are angled upwardly as best illustrated in Fig. 1. The lift levers are horizontally disposed as best illustrated by levers 59, 59A in Fig. 5 and levers 77 in Fig. 2 when the units are in the cotton picking position, and the levers are angled downwardly as best illustrated in Fig. 9 when the units are in the detaching position.

In raising the cotton picking units 101, 111 from the detaching position to the cotton picking position or the carrying position, the hydraulic fluid is caused to flow through line 72 whereby piston 69 is forced forward towards an extended position which in turn will rotate bell cranks 53, 53A, 77 to raise the distal ends of lift arms 59, 59A, 83. Springs 74, 96 which are preferably under tension when the units are in the detaching position or the cotton picking position, and which are preferaly somewhat relieved of tension when the units are in the carrying position, will aid piston 69 in raising units 101, 111.

In lowering the cotton picking units 101, 111 from the carrying position to the cotton picking position or the detaching position, the control means is operated so as to relieve the hydraulic fluid pressure in line 72 whereby the weight of the units will cause the lowering thereof under the influence of gravity. After the units have been lowered to the desired position the hydraulic control means may be operated to retain the hydraulic fluid in line 72 under static conditions whereby piston 69 will remain stationary to hold the units in the desired position.

An alternate manner of stopping the units in picking position is best illustrated in Fig. 10. In the adjustable stop means shown, piston rod 71 is threaded along a portion thereof as at 147, and a nut 149 is threadedly engaged thereon. It will be understood that nut 149 will abut the forward end 151 of cylinder 67, thereby limiting rearward movement of piston rod 71. Thus nut 149 may be adjusted to stop the piston rod 71 in such a position that units 101, 111 will be retained in cotton picking position. Also when it is desired to lower units 101, 111 to the detaching position, nut 149 may be backed off and the hydraulic fluid pressure relieved in line 72 so that the units will be permitted to lower to the detaching position.

To disengage units 101, 111, the units are lowered to a detaching position as heretofore described. In the detaching position the units will be resting on the ground as illustrated in Fig. 9. Nuts 109 and nuts 119 are removed from retaining pins 107, 117, and then lift arms 59, 59A, 83 may be swung downwardly to disengage hooks 99, 100 from bars 105, 115, and the tractor 13 may be driven clear of the disengaged units. It will be understood that the units 101, 111 are preferably disengaged one at a time, that is, first one and then the other disengaged in different localities, whereby tractor 13 will have ample space to be driven away from the units. To attach the units, substantially the converse of the disengaging process is carried out. It will be understood that the units are preferably attached one at a time. Thus to attach unit 101, the tractor is positioned so that hooks 99 are in alinement with bars 105, lift arms 59, 59A are then swung upwardly by the hydraulic actuating means until hooks 99 are in engagement with bars 105, retaining pins 107 are then secured in place by nuts 109, and unit 101 may then be raised clear of the ground. Unit 111 is attached in a manner similar to the above described manner of attaching unit 101.

It will be understood that when the tractor 13 rides on level ground and units 101, 111 are in the cotton picking position, the units will be spaced from the ground, as best illustrated in Figs. 2 and 5. The amount of this spacing is preferably such that when the cotton picker is in use with the wheels in the furrows, the bottom of the picking units will ride slightly above the top of the rows, as best illustrated in Fig. 4.

It will be understood that the lost motion connection between link 93 and arm 65, and between link 87 and arm 84 will permit rearward unit 111 to move upwardly independently of forward unit 101. Thus unit 111 may ride over a slight hill or rise in the terrain without disturbing the forward picking unit 101.

Also it will be apparent that the above mentioned lost motion connections will serve an additional function which is to prevent excess weight from being brought to bear on the rearward unit 111 as when wheels 121 drop into a depression.

Thus the lost motion connection between bell cranks 77 permits pivot of the rearward one of bell cranks 77 relative to the forward one of bell cranks 77 whereby the rearward end of rearward cotton picking unit 111 may tilt upward, and the lost motion connection between depending arms 65 and bell cranks 77 permits downward movement of wheels 121 and framework 11 relative to rearward cotton picking unit 111, whereby the cotton picking unit may assume a disposition as best illustrated in Fig. 5, without disturbing the forward unit 101. Otherwise, when wheels 121 dropped into a ditch unit 111 would carry the weight of unit 101 transferred through the connecting linkages, and if the ditch was of sufficient depth part of the weight of tractor 13 would be brought to bear on unit 111.

I claim:

1. Detachable means for supporting cotton picking units from a tractor comprising a tractor-engaging framework adapted to embracingly and detachably engage said tractor, suspending means mounted on said tractor-engaging framework, said suspending means including rockable lift elements, said lift elements comprising forward lift elements and rearward lift elements, said forward lift elements being mounted on said tractor-engaging framework to one side and adjacent the forward end thereof whereby the forward lift elements are adapted to support a first cotton picking unit in side-by-side relationship with a tractor, said rearward lift elements being mounted on said tractor-engaging framework adjacent the rearward end thereof and offset from said forward lift elements whereby the rearward lift elements are adapted to support a second cotton picking unit in spaced offset relationship with said first cotton picking unit, means interconnecting the forward lift elements with the rearward lift elements for conjoint movement thereof, lift actuating means connected to at least one of said lift elements whereby said lift elements are adapted to conjointly lift cotton picking units when suspended from said elements, said interconnecting means including lost motion connection means whereby said lift elements are adapted to permit independent movement of the picking units when uneven terrain is encountered during use.

2. In a cotton picker, a low bodied tractor, tractor-engaging framework embracingly and detachably engaging said tractor, suspending means mounted on said tractor-engaging framework, said suspending means including rockable lift elements, said lift elements comprising forward lift elements and rearward lift elements, a forward cotton picking unit suspended from said forward lift elements, a rear cotton picking unit suspended from said rearward lift elements independent of and spaced from said forward cotton picking unit, means interconnecting said forward lift elements with said rearward lift elements for conjoint lift action, lift actuating means connected to at least one of said lift elements, said interconnecting means including lost motion connection means whereby said lift elements are adapted to permit independent movement of the picking units when uneven terrain is encountered during use.

3. In a cotton picker, a low bodied tractor, tractor-engaging framework embracingly and detachably engaging said tractor, suspending means mounted on said tractor-engaging framework, said suspending means including pivotable bell cranks, said bell cranks including forward bell cranks and rearward bell cranks, a forward cotton picking unit suspended from said forward bell cranks, a rear cotton picking unit suspended from said rearward bell cranks independent of and spaced from said forward cotton picking unit, means interconnecting said forward bell cranks with said rearward bell cranks for conjoint lift action, said units being shiftable with said bell cranks from and to an elevated position in which said units are spaced from the ground and to and from a detaching position in which said units are in ground contacting position, said units being gravity biased towards detaching position, lift actuating means connected to at least one of said lift elements whereby said lift elements are adapted to conjointly lift said units towards said elevated position.

4. In a cotton picker, a low bodied tractor, tractor-engaging framework embracingly and detachably engaging said tractor, suspending means mounted on said tractor-engaging framework, said suspending means including pivotable bell cranks, said bell cranks including forward bell cranks and rearward bell cranks, a forward cotton picking unit suspended from said forward bell cranks, a rear cotton picking unit suspended from said rearward bell cranks independent of and spaced from said forward cotton picking unit, means interconnecting said forward bell cranks with said rearward bell cranks for conjoint lift action, said units being shiftable upwardly and downwardly with said bell cranks between an upper carrying position in which said units are elevated, an intermediate cotton picking position in which said units are positioned below said upper carrying position and above a ground contacting disposition, and a lower detaching position in which said units are in a ground contacting disposition, spring means connected to said bell cranks urging said units away from detaching position and cotton picking position, said units being gravity biased against said spring means towards detaching position, lift actuating means connected to at leeast one of said bell cranks whereby said bell cranks are adapted to conjointly lift said units towards said upper carrying position.

5. Detachable cotton picker means comprising a tractor-engaging framework adapted to be mounted on a tractor, suspending means mounted on said tractor-engaging framework, said suspending means including rockable lift elements, said lift elements comprising a pair of forward lift elements and a pair of rearward lift elements, a forward cotton picking unit suspended from said forward lift elements, a rear cotton picking unit suspended from said rearward lift elements independent of and spaced from said forward cotton picking unit, a link pivotally connected at one end to one of said forward pair of lift elements and pivotally connected at the other end to the other of said forward pair of lift elements whereby said forward pair are interconnectably joined, a second link pivotally connected at one end to one of said rearward pair of lift elements and having a lost motion connection at the other end with the other of said second pair of lift elements whereby said second pair are permitted limited movement relative to one another to allow tilt of said rear unit, an elongated link pivotally connected at one end to one of said rearward lift elements and having a lost motion connection at the other end with one of said forward lift elements whereby said forward and said rearward lift elements are interconnectably joined and are permitted limited relative movement to allow independent movement of the picking units when uneven terrain is encountered during use, lift actuating means connected to at least one of said lift elements whereby said lift eltments are adapted to conjointly lift said cotton picking units.

6. Detachable cotton picker means comprising a tractor-engaging framework adapted to be mounted on a tractor, suspending means mounted on said tractor-engaging framework, said suspending means including rockable lift elements, said lift elements comprising a pair of forward lift elements and a pair of rearward lift elements, a forward cotton picking unit suspended from said forward lift elements, a rear cotton picking unit suspended from said rearward lift elements independent of and spaced from said forward cotton picking unit, a link pivotally connected at one end to one of said forward pair of lift elements and pivotally connected at the other end to the other of said forward pair of lift elements whereby said forward pair are interconnectably joined, a second link pivotally connected at one end to one of said rearward pair of lift elements and having a lost motion connection at the other end with the other of said second pair of lift elements whereby said second pair are permitted limited movement relative to one another to allow tilt of said rear unit, an elongated link pivotally connected at one end to one of said rearward lift elements and having a lost motion connection at the other end with one of said forward lift elements whereby said forward and said rearward lift elements are interconnectably joined and are permitted limited relative movement to allow independent movement of the picking units when uneven terrain is encountered during use.

7. The combination with a tractor, having a body and having driving mechanisms including a pair of tractor wheels mounted on an axle which is journalled in an axle housing connected to said body, of detachable cotton picking means comprising a tractor-engaging framework detachably mounted on said axle housing and said body, said framework being disposed so as to embrace said body, a first pair of bell cranks pivotally mounted substantially in longitudinal alinement on said framework adjacent the forward end thereof, a left-hand cotton picking unit removably suspended from said first pair of bell cranks, a second pair of bell cranks pivotally mounted substantially in longitudinal alinement on said framework adjacent the rearward end thereof, a right-hand cotton picking unit removably suspended from said second pair of bell cranks, said left-hand unit being disposed in spaced side-by-side relationship with said body and forward of said axle, said right-hand unit being spaced from and disposed rearward of said body and said axle in oppositely facing relationship with said left-hand unit, said units being shiftable with said bell cranks from and to cotton picking position in which said units are spaced from the ground and to and from a detaching position in which said units are in a ground contacting disposition, said units being gravity biased towards detaching positon, hydraulic actuating means, and coupling means connecting said hydraulic actuating means to said bell cranks whereby actuation of said hydraulic means is effective to pivot said bell cranks and move said cotton picking units from detaching position to cotton picking position.

8. The combination with a tractor, having a body and having suitable driving mechanisms including a pair of tractor wheels mounted on an axle which is journalled in an axle housing connected to said body, of detachable cotton picking means comprising a tractor-engaging framework detachably mounted on said axle housing and said body, said framework being disposed so as to embrace said tractor, a first pair of bell cranks pivotally mounted substantially in longitudinal alinement on said framework adjacent the forward end thereof, a second pair of bell cranks pivotally mounted substantially in longitudinal alinement on said framework adjacent the rearward end thereof, a pair of cotton picking units respectively removably suspended from said first and said second pairs of bell cranks, the cotton picking unit suspended from said first pair of bell cranks being disposed in spaced side-by-side relationship with said body and forward of said axle, the cotton picking unit suspended from said second pair of bell cranks being spaced from and disposed rearward of said body and said axle, said units being shiftable from and to a detaching position in which said units are in a ground contacting disposition and to and from an elevated position in which said units are spaced from the ground by pivot of said bell cranks, said units being gravity biased towards said detaching position, hydraulic actuating means, and coupling means connecting said hydraulic actuating means to said bell cranks whereby actuation of said hydraulic means is effective to pivot said bell cranks and move said cotton picking units from said detaching position to said elevated position.

9. The combination with a low bodied tractor of detachable cotton picking means comprising a tractor, a tractor-engaging framework, a first pair of bell cranks pivotally mounted substantially in longitudinal alinement on said framework adjacent the forward end thereof, a second pair of bell cranks pivotally mounted substantially in longitudinal alinement on said framework adjacent the rearward end thereof, a pair of cotton picking units respectively movably suspended from said first and said second pair of bell cranks, the cotton picking unit suspended from said pair of bell cranks being disposed in spaced side-by-side relationship with said body and forward of said axle, the cotton picking unit suspended from said second pair of bell cranks being spaced from and disposed rearward of said body and said axle, lift actuating means, said units being movable from and to a detaching position in which said units are in ground contacting disposition and to and from an elevated position in which said units are spaced from the ground by pivot of said bell cranks, said units being gravity biased towards detaching position, and coupling means connecting said actuating means to said bell cranks whereby actuation of said hydraulic means is effective to pivot said bell cranks and move said cotton picking units from a detaching position to an elevated position.

References Cited in the file of this patent

UNITED STATES PATENTS

| | | |
|---|---|---|
| 2,175,216 | Rust | Oct. 10, 1939 |
| 2,241,423 | Rust | May 13, 1941 |
| 2,613,492 | Rust | Oct. 14, 1952 |
| 2,616,353 | Thomann | Nov. 4, 1952 |
| 2,656,665 | Paul | Oct. 27, 1953 |
| 2,719,394 | Thomann et al. | Oct. 4, 1955 |
| 2,754,649 | Fergason | July 17, 1956 |